(12) United States Patent
Ban et al.

(10) Patent No.: US 6,330,440 B1
(45) Date of Patent: Dec. 11, 2001

(54) METHOD OF AUTOMATICALLY ASSIGNING SIGNALING TERMINALS IN MOBILE COMMUNICATION SYSTEM

(75) Inventors: Dong-Soo Ban; Dong-Hyun Lee; Dong-Seo Park, all of Kyoungki-do (KR)

(73) Assignee: Hyundai Electronics Ind., Co. LTD, Ichon-si (KR)

( * ) Notice: Subject to any disclaimer, the term of this patent is extended or adjusted under 35 U.S.C. 154(b) by 0 days.

(21) Appl. No.: 09/178,866

(22) Filed: Oct. 26, 1998

(30) Foreign Application Priority Data

Nov. 17, 1997 (KR) .................................................. 97-60542

(51) Int. Cl.⁷ ..................................................... H04Q 7/20
(52) U.S. Cl. ......................... 455/424; 455/67.4; 455/560; 379/2
(58) Field of Search ..................................... 455/560, 561, 455/67.1, 67.4, 67.7, 423, 424; 379/5, 2

(56) References Cited

U.S. PATENT DOCUMENTS 5,151,868    9/1992    Nishiyama et al. .

Primary Examiner—Vivian Chang
Assistant Examiner—James Moore
(74) Attorney, Agent, or Firm—J. Harold Nissen; Lackenbach Siegel (57) ABSTRACT

A method of automatically assigning a signaling terminal in a mobile communication system comprising the steps of: receiving an alarm from an SSFA and determining whether the SSFA is connected or removed according to information data of the received alarm; when the SSFA is removed, obtaining an SLP value of a signaling link to which a signaling terminal in the removed SSFA is assigned and determining whether or not there exists an alternative signaling terminal which is not assigned to any signaling link and in a normal state in connected SSFAs; when the alternative signaling terminal is found, updating the value of the SLP of the signaling link to which the signaling terminal of the removed SSFA has been assigned with the alternative signaling terminal in a database and activating the signaling link to which the alternative signaling terminal is newly assigned; when the SSFA is connected, testing loop of a signaling terminal to determine whether or not the signaling terminal is in the normal state; and when the signaling terminal is in the normal state, activating a signaling link corresponding to the signaling terminal.

2 Claims, 8 Drawing Sheets

METHOD OF AUTOMATICALLY ASSIGNING SIGNALING TERMINALS IN MOBILE COMMUNICATION SYSTEM

BACKGROUND OF THE INVENTION

1. Field of the Invention

The present invention relates to a mobile communication system and more particularly to a method of automatically assigning signaling terminals between a switching center and a base station.

2. Description of Related Art

Generally, a mobile communication system is a system allowing for communications during motion. A code division multiple access (CDMA) mobile communication system converts sequential analog signals into codes for transmission. This CDMA system provides a mobile communication mode which is convenient in processing noise and has an advantage of a little power consumption.

Figure 1:
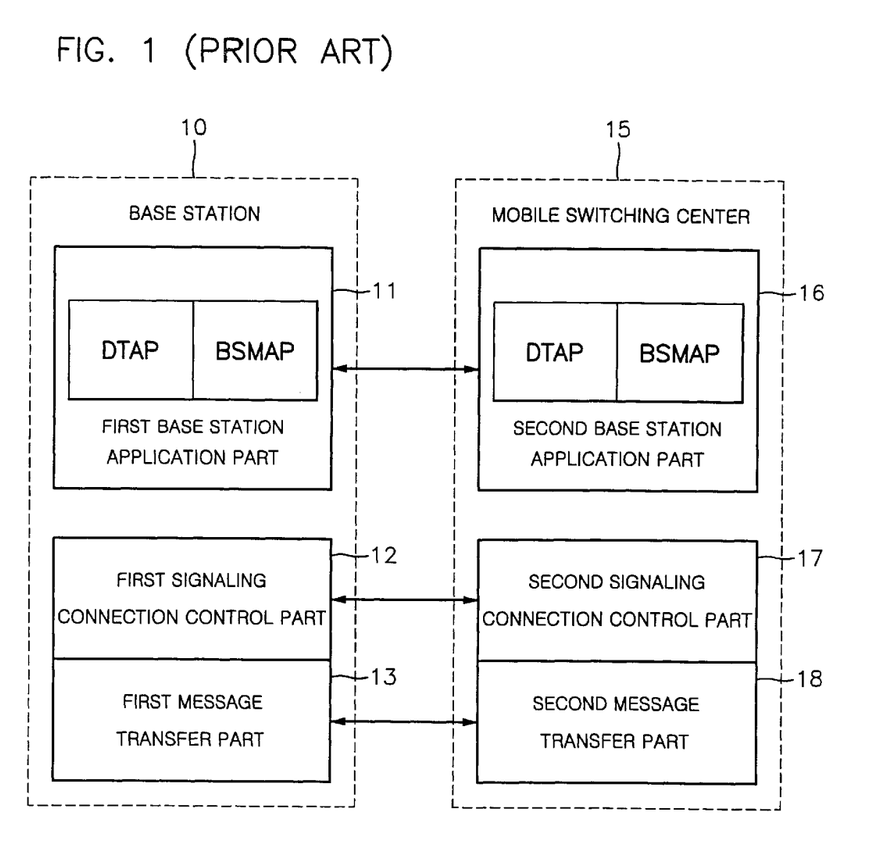
FIG. 1 shows a structure of the typical ITU-T No. 7 signaling system.

FIG. 1 shows a structure of the international telecommunications union-telecommunication sector (ITU-T) No. 7 signaling system in the typical mobile communication system.

As shown in FIG. 1, a base station (BS) 10 for transmitting and receiving messages to and from terminal equipment and switching centers and managing resources and a mobile switching center (MSC) 15 connected to the base station 10, for connecting subscribers 1 and operating for mobile communication services such as a function of charging for use of the system, respectively comprise: first and second base station application parts (B SAP) 11 and 16 dually designed (active and standby) for processing origination and destination of each mobile call, managing the resources, and transmitting subscriber's mobile managing messages; first and second signaling connection control parts (SCCP) 12 and 17 having dual structure, for performing a switch network data service, connection mode service for transferring control information between network management centers, a connectionless mode service for mobile calls, and a routing processing function; and first and second message transfer parts (MTP) 13 and 18 having a dual structure for processing a signaling message and performing a signaling network management function for error recovery and process on the process route of the processed signaling message.

Figure 2:
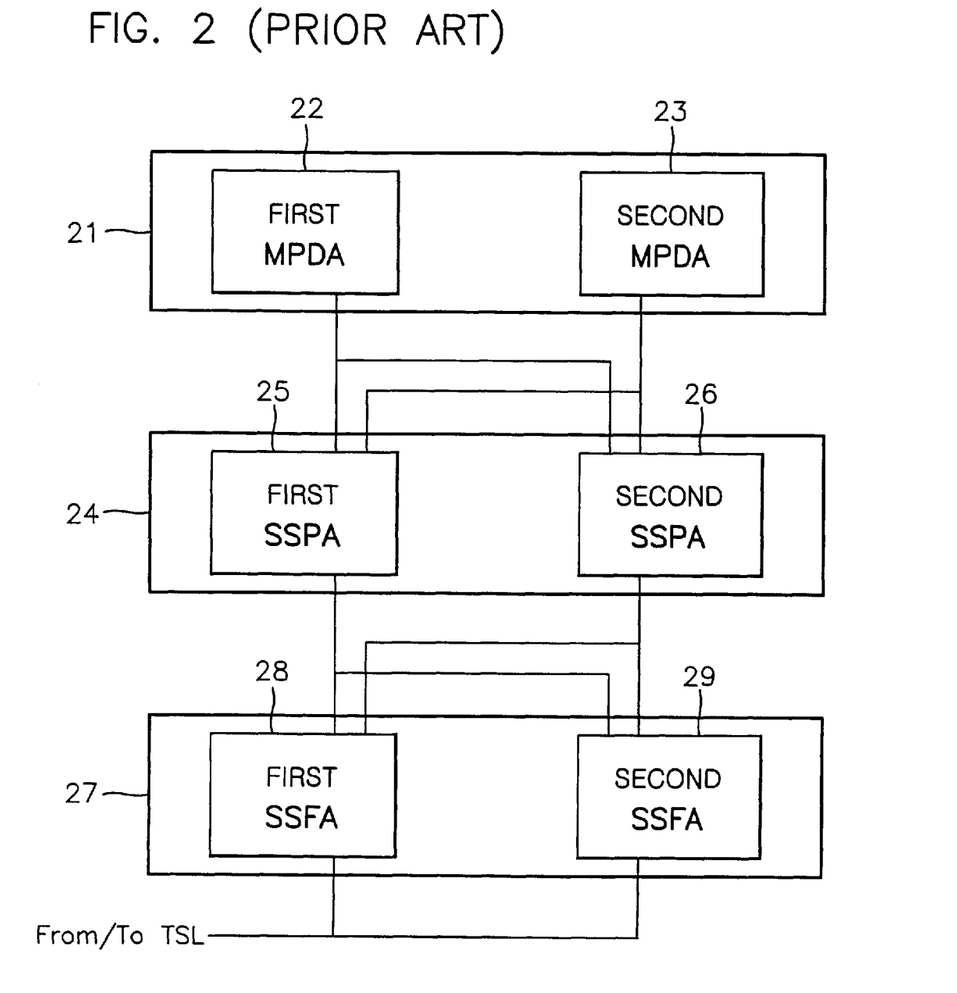
FIG. 2 is a block diagram of hardware for supporting functions of the typical ITU-T No. 7 signaling system.

FIG. 2 is a block diagram of hardware supporting a function of the typical ITU-T No. 7 signaling system, particularly, an access switch subsystem mobile (ASS-M) falling under an access switch subsystem (ASS) of the HDPX-300 (the Hyundai PCS exchange).

As shown in FIG. 2, the hardware comprises: a main processor & duplication control board assembly (MPDA~21 to 23 designed in dual which has software for managing the BSAP 11, 26, SCCP 12, 17, and MTP 13, 26; a signaling system process board assembly (SSPA) 24 to 16 designed in dual which has software for processing a level 3 of the MTP 13, 18 and connection and connectionless mode messages of the SCCP 12, 17 in the MPDA 21; and a signaling system firmware board assembly (SSFA) 27 to 29 designed in dual which has software for a level 2 of the MTP 13,18 in the MPDA 21 and four firmwares.

The MPDA 21 to 23 correspond to an ASS-M access switching processor (ASP), and the SSPA 24 to 26 correspond to the base station application part (BSAP).

Such ASS-M connects to a base station controller and performs a function of processing mobile subscribers calls and managing mobility, a self-maintenance function, a function of transmitting signal information to the base station, mobile station, and base station controller, and a traffic data transmitting function.

Figure 3:
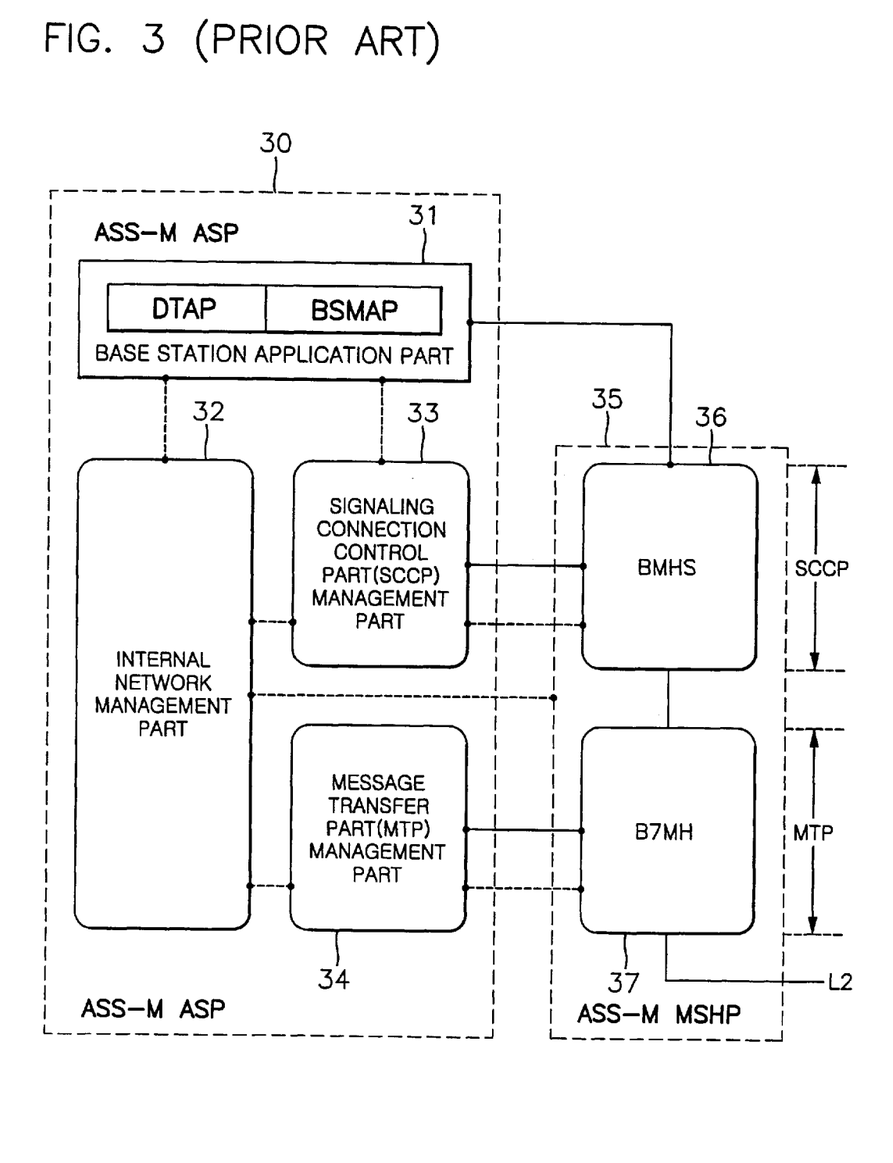
FIG. 3 shows a structure of software for supporting functions of the typical ITU-T No. 7 signaling system.

FIG. 3 shows a structure of software for supporting the functions of the typical ITU-T No. 7 signaling system.

As shown in FIG. 3, there exist: a base station application part (BSAP) 31 having a direct transfer application part (DTAP) and a base station management application part (BSMAP), for processing the origination and destination of mobile calls using the connection and connectionless mode services, managing the resources, and transmitting the subscriber's mobility managing messages; an internal network management part (B7INT) 32 for managing active and standby modes of a mobile signaling handling processor (MSHP), initializing and recovering data of the MSHP, and managing L2 (level 2) firmware of the SSFA 27; an SCCP management part (B7SMG) 33 for managing a signaling, point and subsystem of the SCCP 12, 17 in the other office and a subsystem of its own office; an MTP management part (B7NM) 34 for performing a signaling network managing function of recovering and processing errors on the process route of the signal message of the MTP 13, 18; an MSHP of ASS-M 35 having a BMHS 36 for providing the connection and connectionless mode services to the SCCP 12, 17 and processing the routing and a B7MH 37 for performing the signal message processing of the MTP 13, 18.

Figure 4:
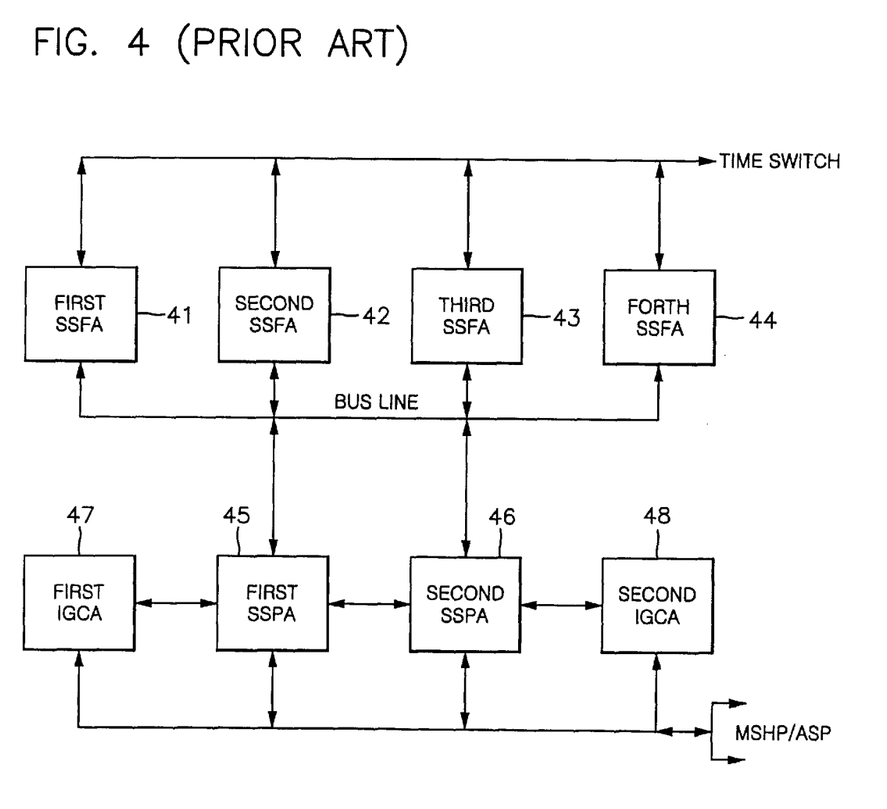
FIG. 4 is a block diagram showing a structure between an SSPA and SSFA depicted in FIG. 2.

FIG. 4 is a block diagram showing a structure between the SSPA 24 to 26 and SSFA 27 to 29 depicted in FIG. 2.

As shown in FIG. 4, there exist: first to fourth SSFAs 41 to 44 having four firmwares, for serving a level 2 of the functions of the typical ITU-T No. 7 signaling system for transmission of signaling messages of the MPDA 21 to 23; first and second SSPAs 45 and 46 connecting to the first to fourth SSFA 41 to 44, for serving a level 3 of the typical ITU-T No. 7 signaling system's functions in the MPDA 21 to 23; first and second integrated global communication board assemblies (IGCAs) 47 and 48 connecting to the first and second SSPAs 45 and 46, for providing routes for processing the signaling messages of the MSHP 35.

The ITU-T No. 7 signaling system having such structure performs dual functions of active and standby modes, supports flow of messages through the protocol No. 7 in interlock of the switching center and base station, the interlock indicating that entities use the same hardware/software signals and parameters, and operates such that the MSHP 35, which is a processor of the SSPA 24, manages the SCCEI 12, 17 and MTP 13, 18 with conception of dualization. The MSHP 35 is a message handling processor for processing messages based upon the typical ITU-T No. 7 signaling system, the processor being one of auxiliary processors each having a unique functions in a switch, and more particularly, a hardware board for actually routing routing the messages received. The MSHP 35 is concerned with the messages, and the SSFA 41 to 44 performs a function of maintaining and supporting paths of the messages through connection to the other office in hardware.

An interface between the base station 10 and the mobile switching center 15, for supporting the international standard (IS)-634, supports open-system type interlock. The A-interface is standard for connection between the mobile switching center and control station in the mobile communication system, and there are standards A, B, C, and D defined according to each interlocked connection point once the system is constructed based upon the open protocol A-interface, it would be interlocked through the connection in hardware.

The MSHP 35 has idle, standby, acting, and active states and has information about a point of its own office, signaling point, signaling link, and subsystem. When two MSHPS 35 are used, one is in the active state and the other is in the standby state. When one MSHP 35 is used and the other is not in use, only the MSHP 35 in use becomes to be in the active state and the other becomes to be in the idle state. When the MSHP 35 converts from the idle state to the active or standby state, it stays at a wait state between the two states for a little while, which corresponds to the acting state.

Management of signaling terminals using a conventional load share method to manage such MSHP 35 is effected as follows.

The MSHP 35 is supposed to be in an activation or inactivation state. The MSHP 35 actually needs software for processing messages and data for routing the messages. The activation of the MSHP 35 indicates the state at the time point when the loading of the message processing software on the MSHP 35 is completed and the transmission of the routing data for process of the messages is completed after power is turned on in hardware.

Each MSHP 35 manages four signaling terminals. Two activated MSHPs 35 therefore manage eight signaling terminals.

When one activated MSHP 35 is converted into the inactivation state, the signaling terminals which are assigned to the MSHP 35 in hardware become to be inactivated, thus making the MSHP 35 useless. Then the other MSHP 35 in the activation state becomes to take charge of managing the signaling terminals which were under the management of the MSHP 35 previously in the activation state but now in the inactivation state. In this case, a single MSHP 35 is subject to management of eight signaling terminals. In other words, each MSHP 35 is designed to check the other's state periodically in an order of an operation system. Hence, when one is activated, the other recognizes this factor in real time and takes over the work of the inactivated MSHP 35.

However, when a signaling link is inactivated due to trouble in a signaling terminal which is assigned to the signaling link, another activated signaling terminal is not assigned to this inactivated signaling link, thus not being able to activate the signaling link in the conventional technology. When the SSFAs 41 to 44 having four signaling terminals are removed, the signaling links of the SSFAs 41 to 44 are inactivated. This inactivated signaling link cannot be assigned another active signaling terminal, so it cannot be newly activated. Information on the signaling terminals among the information maintained by the MSHP 35 for process of the messages is very important. When one MSHP 35 which processes the signaling terminals is inactivated and the other MSHP 35 is subject to process of the signaling terminals of the inactivated MSHP 35, a failure of managing the signaling terminals results in loss of the messages.

Accordingly, the conventional technology which do not have a function of automatically assigning signaling terminals cannot activate signaling links which have been inactivated due to inactivation of the signaling terminals assigned thereto, thereby making it difficult to manage the signaling network. Namely, error in the ITU-T No. 7 signaling system makes the switching center come to a stop. When the signaling link is inactivated because of the trouble in the corresponding signaling terminal, the conventional technology not having an automatic assigning function has a serious problem in managing the signaling network.

SUMMARY OF THE INVENTION

Accordingly, the present invention is directed to an automatic signaling terminal assigning method in a mobile communication system that substantially obviates one or more of the limitations and disadvantages of the related art.

An object of the present invention is to provide an automatic signaling terminal assigning method of automatically testing and removing factors which may disturb communication through a call due to fault in a signaling link of a signaling terminal between a switching center and a base station and assigning a normal signal point in a mobile communication system, thereby improving reliability of the system.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a method of automatically assigning a signaling terminal in a mobile communication system includes the steps of: receiving an alarm from an SSFA and determining whether the SSFA is connected or removed according to information data of the received alarm; when the SSFA is removed and disconnected, obtaining a value of a signaling link pointer (SLP) of a signaling link to which a signaling terminal in the removed SSFA is assigned and determining whether or not there is an alternative signaling terminal which is not assigned to any signaling link and in a normal state in connected SSFAs through an automatic assigning function; when the alternative signaling terminal is found in the connected SSFA, updating the value of the SLP of the signaling link where the signaling terminal of the removed SSFA has been assigned with the alternative signaling terminal in a database and activating the signaling link to which the alternative signaling terminal is newly assigned; when the SSFA is connected, testing loop of a signaling terminal to determine whether or not the signaling terminal is in the normal state; and when the signaling terminal is in the normal state, activating a signaling link corresponding to the signaling terminal.

In another aspect of the present invention, a method of automatically assigning a signaling terminal in a mobile communication system includes the steps of: when fault of a signaling terminal in an active SSFA is marked, determining whether or not the signaling terminal is assigned to any signaling link; when the signaling terminal having the fault is determined to be assigned to a signaling link, obtaining an SLP value of the signaling link corresponding to the signaling terminal having the fault and reporting the fault of the signaling terminal; after reporting the fault of the signaling terminal, determining whether or not a standby SSFA has an alternative signaling terminal that is in the normal state and that is not assigned to any signaling link; when the standby SSFA has no alternative signaling terminals, determining whether or not the active SSFA including the signaling terminal having the fault has an alternative signaling terminal which is not assigned to any signaling link and is in the normal state; and when it is determined that the active SSFA has an alternative signaling terminal, updating the SLP value of the signaling link where the signaling terminal having the fault has been assigned in a database with the alternative signaling terminal and activating the signaling link where the alternative signaling terminal is newly assigned.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENT

Reference will now be made in detail to the preferred embodiments of the present invention, examples of which are illustrated in the accompanying drawings.

An embodiment according to an automatic signaling terminal assigning method in a mobile communication system according to the present invention will now be described in detail.

The ITU-T No. 7 protocol is a kind of common channel signaling system which has separate lines respectively for data transmission and for maintenance and management of the transmission. This protocol is designed to minimize loss of messages and defines use of an alternative line in case of fault in a line, use of an alternative route in case of fault in a signal route, and so on.

The signaling link is a logical information transmission line connecting a signaling end point to another signaling end point, a signaling transfer point to another signaling transfer point and a signaling end point to a signaling transfer point in a common channel signaling network comprising the signaling end points, signaling transfer points, and transmission lines connecting the points. The transmission of signals between two adjacent points cannot be properly accomplished only by existence of a physical transmission line and transmit and receive units. It can be effected only after signal rate over the transmission line, a type of the signal, a method of building up synchronization of signals, order for error control, and the like are defined. According to the ITU-T No. 7 signaling system, the signaling link is on the basis of 64 kbps and has functions of identifying a variable length signal unit, building up synchronization of the signal unit based upon a block code called a flag, correcting errors by retransmitting all units after error check, and monitoring a state of the link by measuring an error rate.

The term "signaling terminal" is disclosed in the ITU-T recommendation x. 75 and indicates a function of the switching center for international packet trunk exchange. In other words, the signaling terminal is a portion corresponding to a layer 1, 2, or 3 in an open system interconnection (OSI) model for controlling packet transmission and setting/cancellation of a route after the packet transmission.

Figure 5:
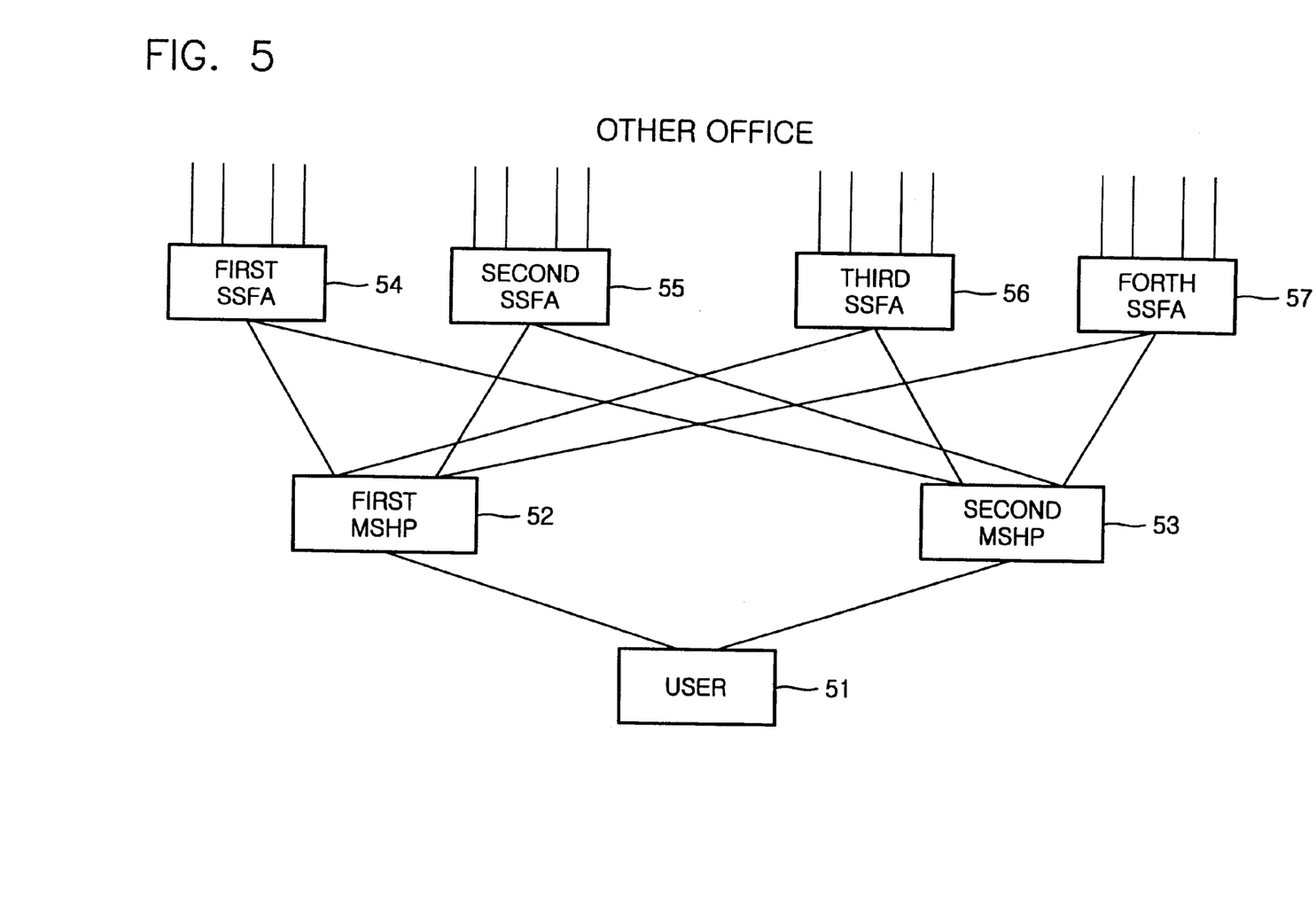
FIG. 5 is a block diagram showing a structure between an MSHP and SSFA according to the present invention.

FIG. 5 is a block diagram showing a structure between an MSHP and SSFA according to the present invention.

As shown in FIG. 5, there exist: first and second MSHPs 52 and 53 for managing assignment of the signaling terminals in first to fourth SSFAs 54 to 57 according to a control command of a user 51 when the switching center and the base station are interlocked; and first to fourth SSFAs 54 to 57 for transmitting signal messages based on the level 2 of the No. 7 according to the management of the first and second MSHPs 52 and 53.

Figure 6:
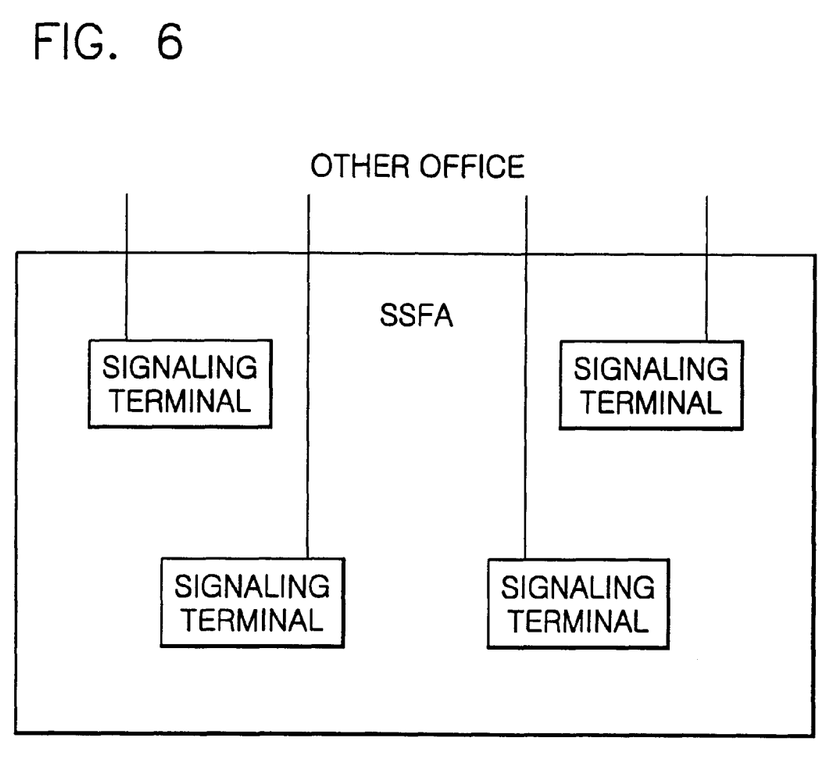
FIG. 6 shows a structure of the SSFA having four signaling terminals in FIG. 5.

FIG. 6 shows a structure of the SSFA 54 to 57 depicted in FIG. 5, the SSFA having four signaling terminals.

When the first and second MSHPs 52 and 53 are both activated, each MSHP 52, 53 controls the first to fourth SSFAs 54 to 57 to manage the signaling terminals.

Figure 7:
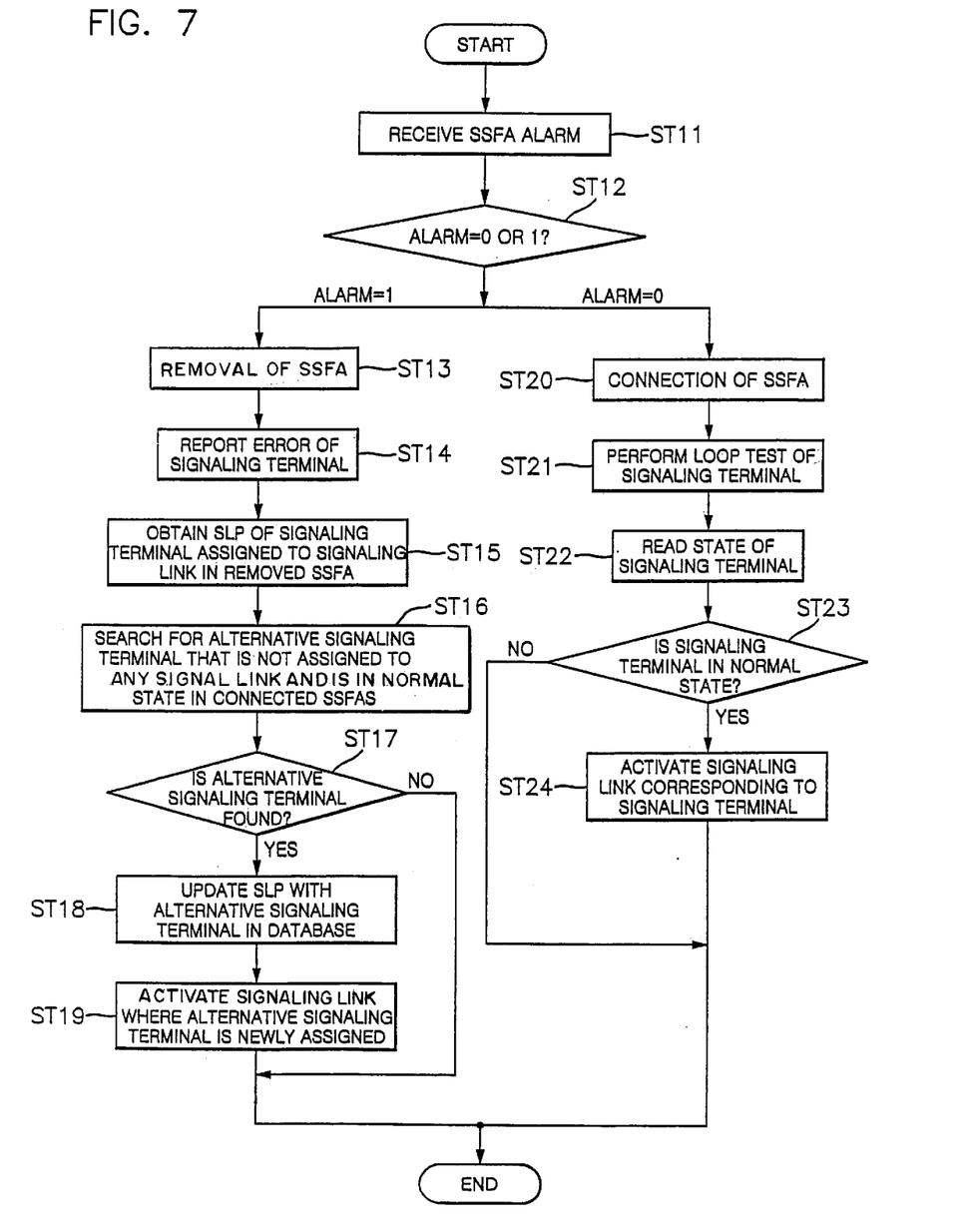
FIG. 7 is a flow chart showing how a signaling terminal is automatically assigned when an alarm indicating removal of the SSFA is received according to the present invention.

FIG. 7 is a flow chart showing how the signaling terminal is automatically assigned when an alarm indicating removal of an SSFA is received according to the present invention.

When an alarm from the SSFA 54 to 57 is received, whether the SSFA 54 to 57 is connected or removed is determined based upon information data of the received alarm (ST11 and ST12). When the SSFA 54 to 57 is removed, a value of an SLP of a signaling link to which a signaling terminal is assigned is obtained and whether or not there exists an alternative signaling terminal which is not assigned to any signaling link and which is in a normal state in connected SSFAs 54 to 57 is determined through an automatic assigning function (ST13 to ST17). When the alternative signaling terminal which is not assigned to any signaling link and which is in the normal state is found, the value of the SLP of the signaling link to which the signaling terminal in the removed SSFA has been assigned is updated in a database with the alternative signaling terminal and then the signaling link to which the alternative signaling terminal is newly assigned is activated (ST18 and ST19). When the SSFA 54 to 57 is determined to be connected, loop of a signaling terminal is tested to determine whether or not the signaling terminal is in the normal state (ST20 to ST22). When the signaling terminal is in the normal state, a signaling link corresponding to the signaling terminal is activated (ST24).

This procedure corresponds to a function of transmitting an error message of the board to an upper management block through a diagnostic routine of the board. Errors may be caused by remove of the board or inferiority of firmware in the board.

The following description concerns how the signaling terminal is automatically assigned when the alarm indicating removal of the SSFA 54 to 57 is received.

A state of the signaling link can be defined inact, acti, or act, and a state of the signaling terminal can be defined Norm (normal), Fmark (fault mark), Test (test of the signaling terminal), or Delt (remove). When the signaling link is in the act state, this means that the link has the signaling terminal of the normal state. When the signaling link is not in the act or acti state, the internal network management part 32 (FIG. 3) tests the state of a signaling terminal assigned to the signaling link so as to manage signaling terminals.

The following is the procedure of automatically assigning a signaling terminal when an alarm is generated by the SSFA 54 to 57.

When the alarm of the SSFA 54 to 57 is received (ST11), whether the SSFA S4 to 57 is removed or connected is determined according to information data of the received alarm (ST12). This is accomplished by checking a database since the information of the removal or connection of the SSFA 54 to 57 is recorded in the database.

When the SSFA 54 to 57 is removed and not connected (ST13), the SSFA 54 to 57 is in the inact state where its signaling terminals cannot process messages, so a signaling link corresponding to a signaling terminal in the removed SSFA 54 to 57 should be inactivated. The relevant signaling link is inactivated by reporting an error of the corresponding signaling terminal to the MTP managment part 34 (FIG. 3) (ST14). Throughanautomaticassigningfunction, avalue of an SLP of a signaling link where the signaling terminal in the removed SSFA 54 to 57 is assigned is obtained (ST15). The SLP value corresponds to a value of a signaling link that a corresponding signaling terminal has.

An alternative signaling terminal that is not assigned to any signaling link and is in the normal state is searched for in the connected SSFA 54 to 57 based upon the database (ST16 and ST17). When the alternative signaling terminal that is not assigned to any signaling link and is in the normal state is found, the SLP value of the database relation showing the states of signaling links is updated with the alternative signaling terminal found. A relation database (Relation DB) is employed as a medium for reliably storing present states of the boards therein by the switching center. Through updating using primitive of such database, the state of the signaling terminal is reliably stored in the database (ST18).

A signal for performing activation of the signaling link to which the alternative signaling terminal is newly assigned is sent to the MTP management part 34 (B7NM) to activate signals (ST19). The B7NM block 34 which received the signal for activating the signaling link requests the firmware to activate the relevant signaling link. The signaling link is activated by operation of the firmware. Although two signaling terminals are completely connected to each other in hardware, they should go through the activating process to properly perform signal message transmission based on the ITU-T No. 7 signaling system. This activating process is accomplished by sending and receiving and processing particularly defined signals, and the firmware supports this operation. When the firmwares are synchronized, the upper B7NM 34 sends and receives a message having a particular pattern to and from the B7MH 37 (FIG. 3) in order to identify the synchronization, thus making the signaling terminals usable.

Alternatively, when the SSFA 54 to 57 is inserted and connected (ST20), a self-test (loop test) of the board 54 to 57 is performed with respect to its four signaling terminals to recognize the states of the signaling terminals and the database is updated (ST21). As a result of the loop test, it is determined that the signaling terminal is in the normal state and assigned to a signaling link (ST22 and ST23), then a signal for activating the relevant signaling link is sent to the MTP management part 34, so the signaling link is activated (ST24).

Figure 8:
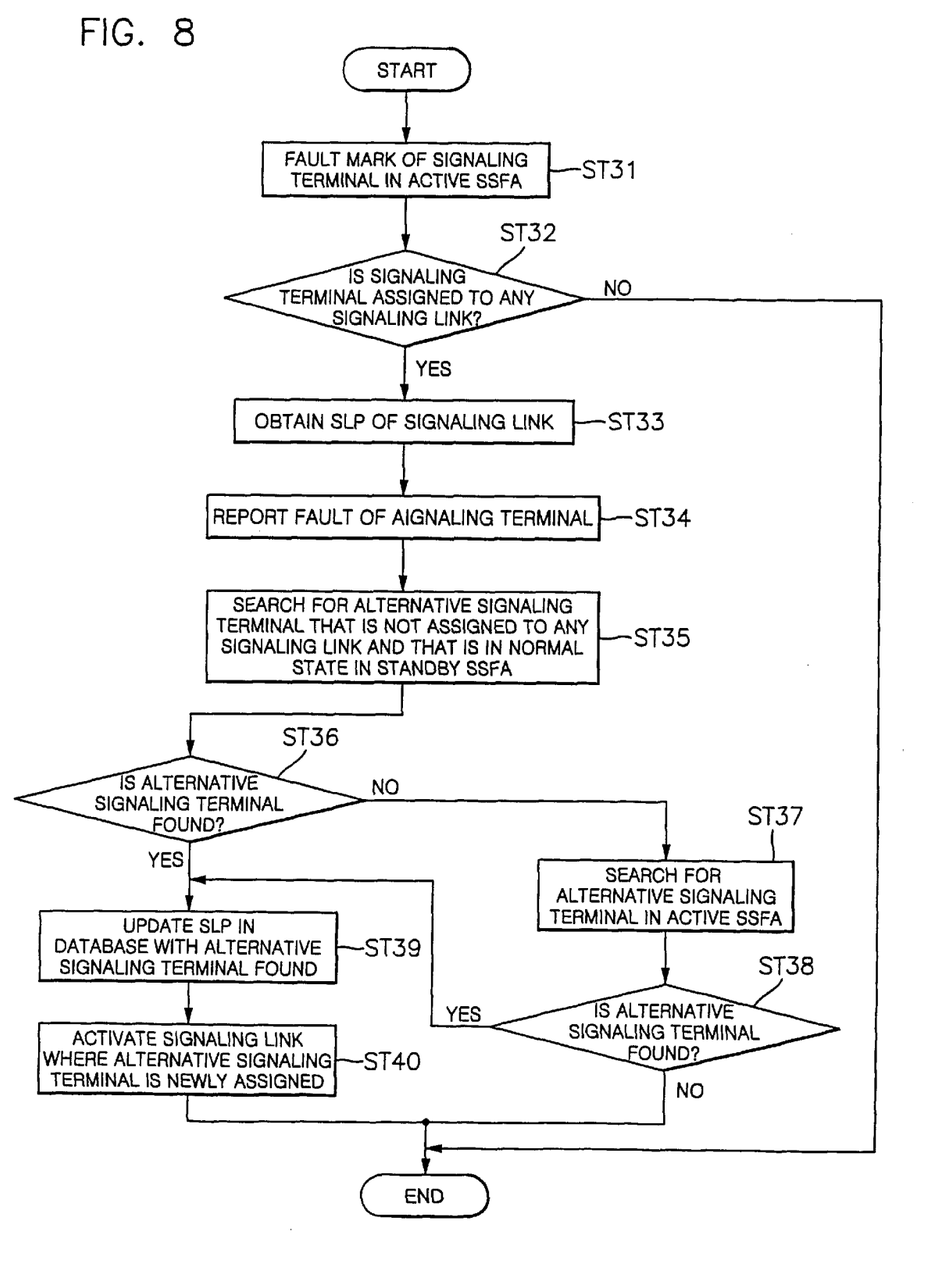
FIG. 8 is a flow chart of an automatic signaling terminal assigning method when a signaling terminal is determined to have fault.

FIG. 8 is a flow chart of an automatic signaling terminal assigning method when a signaling terminal is determined to have fault.

When fault in a signaling terminal in the active SSFA 54 to 57 is marked, whether or not the signaling terminal is assigned to any signaling link is determined (ST31 and ST32). When the signaling terminal is assigned to a signaling link, an SLP value of the signaling link where the signaling terminal having the fault is assigned is obtained and the fault in the signaling terminal is reported (ST33 and ST34). After reporting the fault in the signaling terminal, whether or not the standby SSFA 54 to 57 has an alternative signaling terminal that is in the normal state and is not assigned to any signaling link is determined (ST35 and ST36). When an alternative signaling terminal which is not assigned to any signaling link and is in the normal state is not found in the standby SSFA 54 to 57, the active SSFA 54 to 57 is checked to determine whether or not it has an alternative signaling terminal which is not assigned to any signaling link and is in the normal state (ST37 and ST38). When an alternative signaling terminal is found in one of the active and standby SSFAs 54 to 57, the SLP value of the signaling link where the signaling terminal having the fault is assigned is updated in a database with the alternative signaling terminal found and the signaling link to which the alternative signaling terminal is newly assigned is activated (ST39 and ST40).

The following is detailed description concerning the procedure where a new alternative signaling terminal is automatically assigned to a signaling link when the signaling link is dead due to fault in a relevant signaling terminal.

When a fault mark of a signaling terminal in the active SSFA 54 to 57 is recognized through the database (ST31), whether or not the signaling terminal having the fault is assigned to any signaling link is determined (ST32). The fault mark of the signaling terminal results from inferiority of the firmware of the signaling terminal or badness of the relevant SSFA 54 to 57. The signaling terminal may not transmit messages based upon the protocol No. 7 because of the inferiority of its firmware or noise on a connection line to the other office, which is represented with the fault mark of the signaling terminal.

When it is determined that the signaling terminal having the fault has been assigned to a signaling link, an SLP value of the signaling link corresponding to the signaling terminal is obtained (ST33). Thus the signaling link value of the signaling terminal having the fault is obtained. A single signaling link is managed according to a combined factor such as signaling terminal and state information. Fault is detected from certain signaling link of certain signal point, then which signaling terminal has the fault is detected through the SLP. The SLP is a value of an index of the relation database.

The fault of the signaling terminal is reported to the MTP management part 34 and the fact that the signaling link of the signaling terminal having the fault becomes inactivated is recorded in the database (ST34).

The database is checked to find an alternative signaling terminal which is not assigned to any signaling link and is in the normal state in the standby SSFA 54 to 57 (ST35 and ST36). That the signaling terminal is in the normal state means that the signaling terminal properly performs message processing. When it is determined that the alternative signaling terminal satisfying the conditions described above does not exist in the standby SSFA 54 to 57, the alternative signaling terminal satisfying the conditions is searched for in the present board where the fault of the signaling terminal is detected (ST37 and ST38).

After finding out the alternative signaling terminal satisfying the conditions, the SLP of the database is updated with the alternative signaling terminal (ST39). A signal for activating the signaling link to which the alternative signaling terminal is newly assigned is sent to the MTP management part 34 to activate the signaling link. Through such procedure of automatically assigning signaling terminals, the signal link can be maintained in the active state.

According to the method of automatically assigning signaling terminals in the mobile communication system of the present invention as described above, the IS-634 support can be effectively performed when the switching center and the base station are interlocked, and it is possible to effectively manage and maintain signaling terminal resources by finding and using an alternative signaling terminal when a signaling terminal have fault or while it is being repaired.

It will be apparent to those skilled in the art that various modifications and variations can be made in an automatic signaling terminal assigning method in a mobile communication system of the present invention without deviating from the spirit or scope of the invention. Thus, it is intended that the present invention cover the modifications and variations of this invention provided they come within the scope of the appended claims and their equivalents.

What is claimed is:

1. A method of automatically assigning a signaling terminal in a mobile communication system, the method comprising the steps of:

receiving an alarm from a signaling system firmware board assembly (SSFA) and determining whether the SSFA is connected or removed according to information data of the received alarm;

when the SSFA is determined to be removed and disconnected, obtaining a value of a signaling link pointer (SLP) of a signaling link to which a signaling terminal in the removed SSFA is assigned and determining whether or not there exists an alternative signaling terminal which is not assigned to any signaling link and in a normal state in connected SSFAs through an automatic assigning function;

when the alternative signaling terminal which is not assigned to any signaling link and is in the normal state is found, updating the value of the SLP of the signaling link to which the signaling terminal of the removed SSFA has been assigned with the alternative signaling terminal in a database and activating the signaling link to which the alternative signaling terminal is newly assigned;

when the SSFA is determined to be connected, testing loop of a signaling terminal to determine whether or not the signaling terminal is in the normal state; and when the signaling terminal is in the normal state, activating a signaling link corresponding to the signaling terminal.

2. A method of automatically assigning a signaling terminal in a mobile communication system, the method comprising the steps of:

when fault of a signaling terminal in an active SSFA is marked, determining whether or not the signaling terminal is assigned to any signaling link;

when the signaling terminal having the fault is determined to be assigned to a signaling link, obtaining an SLP value of the signaling link corresponding to the signaling terminal having the fault and reporting the fault of the signaling terminal;

after reporting the fault of the signaling terminal, determining whether or not a standby SSFA has an alternative signaling terminal that is in the normal state and that is not assigned to any signaling link;

when the standby SSFA has no alternative signaling terminal, determining whether or not the active SSFA including the signaling terminal having the fault has the alternative signaling terminal which is not assigned to any signaling link and is in the normal state; and when it is determined that the active SSFA has the alternative signaling terminal, updating the SLP value of the signaling link to which the signaling terminal having the fault, has been assigned in a database with the alternative signaling terminal and activating the signaling link where the alternative signaling terminal is newly assigned.

* * * * *